_UNITED STATES PATENT OFFICE._

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-BOTTOM FILLER.

945,294.            Specification of Letters Patent.    Patented Jan. 4, 1910.

No Drawing.        Application filed July 2, 1906.  Serial No. 324,368.

*To all whom it may concern:*

Be it known that I, ANDREW THOMA, a citizen of the United States, residing at Cambridge, in the county of Middlesex and State of Massachusetts, have invented an Improvement in Shoe-Bottom Fillers, of which the following description is a specification.

In my Patent No. 832,002 I have described a shoe-bottom filler which is adhesive, cohesive, unchangeable, quick-setting, non-inflammable, elastic or non-shifting in the shoe, these being characteristics desirable in such an article. I attain these results as set forth in said Letters Patent by treating resinous vegetable gums with non-oxidizing oils and resins or by using resinous residuum of petroleum if of the proper consistency by itself, or in conjunction with resins and vegetable gums to toughen or soften the binder. My patent sets forth the making and using of a shoe filler which is capable of softening at a low heat and can be best applied while under the influence of heat, and if applied hot, it is necessary, as a practical matter to employ heated laying tools.

By "quick-setting" as used above, I mean the capacity to cool or set almost immediately after use. This is probably due to the fact that my filler passes from a state of viscid stickiness, almost fluidity, to a state of comparative rigidity within a limited range of temperature and with the loss of but little heat since it has little capacity for retaining or holding heat. By "low-melting" I mean the capacity to pass from a comparatively solid to a relatively fluid state at a low temperature and this temperature in my filler is low enough not to injure the leather and also low enough not to cause the evaporation of the water with which the leather of the sole is usually soaked, *i. e.*, it should be below 212 F. If made to be used so as to melt at a temperature above the boiling point of water it may become too quickly chilled by the ebullition of the absorbed water. By "non-inflammable" I mean the quality of not being likely to catch fire under conditions of ordinary use, and this is because I employ no volatile inflammable solvent.

My present object is to reduce the cost of the filler and lessen the labor attending its use, and accordingly I have improved my filler in that while it has the above desirable characteristics, it can readily be applied without a heated tool, roll or the like. In fact, my invention provides a filler which it is practicable to apply cold as distinguished from being applied when hot or in the presence of heat as above. Hereinafter I have set forth that I prefer to employ heat in connection with the use of my present filler and I have set forth various details of use and advantages depending upon heat, but this is preferred merely, as my invention is also new in providing a filler containing comminuted filler material mixed with a gelatinous adhesive mass to a consistency rendering the filler capable of being spread by hand in a cold state so as to form a tenacious, normally pliable layer, normally adherent to the leather of the shoe-bottom.

Another advantage of the species of the filler herein set forth is that it is capable, in its manufacture, of being accurately regulated as to its pliability, stickiness, quick-setting, quality, etc., so that it may be made as a slab having a normally non-sticky exterior, for instance, or it may be quite rigid or extremely pliable, or have strong or weak cohesion, etc.

My present invention depends upon a gluey or gelatinous base admixed with resinous and gummy adhesive substances in such manner and by such means that I am able to obtain in a great degree the good and practical qualities set forth in my patent aforesaid. This filler is very tractable, so that I am able to mold it into thin slabs, thin loaves, or strips to be died out according to the needs of the shoe manufacturer, thereby greatly facilitating its practical application.

As before, I prefer to apply my present filler through the agency of heat. It is capable of being melted and applied in a semi-fluid condition the same as the previous filler, but while the previous filler could be applied cold only with difficulty, because of its extremely sticky and cohesive composition, it is perfectly feasible with my improved filler to apply it cold, as its composition is capable of such nice regulation that the cohesiveness and stickiness can be modified to any extent desired so that the mass can be formed or molded as may be desired. I prefer to prepare it in the form of strips, as stated, although it will be understood that it may be prepared in mass and applied by heat the same as explained in my aforesaid patent. When prepared in the form of a strip, the strip may consist entirely of the binder or composition without any cork or other admixed filler material, but it is preferably mixed with ground cork or other fragmentary filler material. It will be understood, however, that, excepting as otherwise stated in the claims, I intend to cover my present filler put up in any convenient commercial form.

One of the leading characteristics or features of my present invention is the employment of a gluey or gelatinous base, which, on account of its bulkiness secures the lightness desirable for a filler and on account of its extreme pliability and resiliency provides a superior cushion for the foot, having a rubber-like character, but yet not having the "drawing" tendency of rubber. Rubber is heating to the foot, whereas I have succeeded, by my present invention, in producing a filler which has the superior characteristics as to resiliency, etc., of the best rubber, or in other words is rubber-like in all its advantageous qualities, and yet is not heating to the foot and adapted in a superior degree to the purposes of a shoe-bottom filler. It is durable and permanent or practically unchangeable, i. e., for the purposes of a shoe filler,—as it will be understood that I do not means by these terms here or in the claims that it is so forever, but it is so for all practical purposes of its intended use, remaining so long beyond the life of a shoe.

To bring about the results above outlined I saturate glue or other gelatinous substance with only enough water or other suitable solvent determinable by the nature of the gelatinous material to facilitate the melting thereof under heat (in a glue-pot, for example). When reduced to a thick fluid mass or thoroughly dissolved and smooth flowing, I add for every pound of glue from one to two pounds of a fluid constant under all usual conditions, such as glycerin, and these are thoroughly mixed together under the influence of gradually increasing heat until most of the water solvent has been evaporated. The purpose of the water is simply to soften and melt the glue, and having accomplished this purpose it is desirable to eliminate it more or less, as it is objectionable in the filler, provided the filler is to be made water-proof. A small proportion of stearic acid or the like is added during the evaporating process to facilitate the subsequent melting and admixing of the further ingredients. Next I introduce vegetable or mineral resins the latter including such as commonly known as "wax tailings" and the harder, lighter colored, resinous residuum of petroleum to stiffen the mass, and vegetable gutta-percha, and vegetable gums of the nature of gutta-percha or the like to toughen the mass, and either a mineral pitch (including the heavy, black, fluid, tarry residuum of petroleum) to lower the melting point and provide stiffness, etc., or viscous oils which unite with the resin and vegetable gums to accomplish much the same result as the mineral pitch in producing a low melting point, stickiness, and a strong adhesive quality to the mass. It is advisable to melt the gums separately before mixing with the gelatinous base.

The proportions of parts may be varied widely, according to the predominating character which it is desired to give to the filler, and according to the particular shape in which it is desired to offer it to the trade. For practical purposes I prefer to use about five parts of a solution consisting of four parts of the galatinous base (this term including the various glues), such as albumen glue, casein glue, starch glue, vegetable glue, marine glue, etc. three parts of glycerin and one part of stearic acid, and to this solution I add approximately seven parts of semi-solid resinous residuum of patroleum and two parts of rosin and mix the same while heated. Or if the above mentioned hard variety of residuum of petroleum is not available or it is preferred to employ altogether the viscous oils, I may use the latter with rosin and such vegetable gums as pontianac, gutta-percha, tuna, or the like. The viscous oils are used to advantage with the above residuum of petroleum and rosin when the compound is stiff and hard, serving to soften the same and lower the melting point, and, in conjunction with the pitch, resins, and gums, also serving to render the compound sticky and adhesive and more plastic. Tuna for instance is quite resinous and hard, and may not only take the place of the mineral pitch, but also of the resin in stiffening as well as toughening the mass. These gums and resins are dissolved in the oil by heat and thoroughly admixed with the gelatinous base (which has been previously made into a nearly waterless solution through the agency of glycerin or the fatty acids such as oleic, palmitic or stearic acids).

Because of the distinctively different properties and ingredients which I make use of in my improved filler, it is perfectly practicable to regulate the filler with extreme nicety, simply by causing one property to hold in check the other, thereby controlling the pliability or excessive stickiness or the cohesion and adhesion of the component parts of the filler and its water-repellent qualities, etc. I regard this capability of exact control as one of the most important features of my invention. I unite or combine the water absorbent and the water repellent forces, so that each balances the other when so desired, or either may be allowed to predominate. If the former predominates, the filler is more readily workable and sheeted, less adhesive and more resilient, whereas if the latter, i. e., the resinous or gummy property, predominates, the filler is tougher and less responsive, but more sticky. For these reasons by present filler affords a wider scope and variety than my patented filler aforesaid. It is not necessary to use ground cork or other supporting material, as the required stability or substance is in the binder itself alone, although I prefer to admix more or less filler material, preferably of a fibrous nature, such as shredded cork, chopped jute or the like.

To render the broad character of my invention more apparent, I will explain the compound again from a slightly different standpoint. The glue or gelatinous matter is usually of animal origin and subservient to a water solvent, whereby its adhesive principle is readily and quickly developed, but leaving it slow-drying and not waterproof, while on the other hand the fatty acids eliminate the objectionable water without destroying the resiliency which the water has developed, but rather adding to the rubber-like nature of the mass and at the same time giving permanency thereto. Also, being themselves waxy and smoothing, they change the nature of the glue from its stiff or strong stickiness to a workable resilient material, comparatively smooth to the touch, and quick setting. At this stage of the process the contained water has been practically eliminated but the water-absorbent quality of the mass still remains, so that if the mass were immersed in water it would still expand and be variable in character instead of unchangeable. Therefore, to impart water-repellent and stable qualities and, if desired, to impart a stickiness which is not influenced by moisture, I add a water repellent component, which may consist of various ingredients, as resinous, pitchy and gummy substances or viscous oils holding in solution with the aid of heat the resinous and gummy substances. A resinous substance, if of proper consistency and character, acts as a binder and not only makes the mass water-repellent, but possesses a lower melting point and makes the filler quick-setting and easy flowing, or moldable and workable, but if a resinous substance is used having a harder consistency and high melting point, such as rosin, I secure the desired result by adding any oily solvent, preferably of a viscous nature. I next thoroughly mix the compound with cork dust or the like, and when the gelatinous base or gluey component predominates, it makes a compact mass, which, when sheeted and died out can be stuck in the shoe-bottom cavity by first touching it to a hot iron or by the application of paste, and on the other hand, when the binder (i. e., the resinous or gummy component) predominates, it can more readily be put into the shoe by heating the mass and applying the same with a wet tool (or with a hot tool as set forth in my patent aforesaid). When made in the most complete and preferred manner herein set forth, the filler is unchangeable, has practically no shrinkage, is permanently elastic, cohesive, adhesive, quick-setting, water-repellent, and non-inflammable, besides being light in weight, easily used, inexpensive as compared with naphtha-rubber cement filler, and if carefully made and properly used is odorless. Also, whether all or only a part of these characteristics are present in the filler as defined in certain of my broader claims, I believe myself to be the first to have invented a shoe-bottom filler having a gelatinous or pulpy, jelly-like consistency capable of being spread cold by hand and of maintaining the cork in a permanent sheet in the shoe, not stiff nor brittle, but pliable and sticking fast to the leather or other substance of the innersole, all as defined in certain of the claims. This is in distinction from filler composed of cork mixed with rubber cement, and filler composed of cork mixed with ordinary flour paste, both of which quickly dry out and hence become stiff and more or less brittle and crisp, so that the cork is liable to crack or loosen and disintegrate more or less under the flexing action of the shoe in walking.

Having described my invention, what I desire to secure by Letters Patent is,

1. A shoe-bottom filler, consisting of a low-melting, quick-setting, resilient mass containing a water-absorbent component and a water-repellent component.

2. A shoe-bottom filler, consisting of a low-melting, quick-setting, resilient mass containing a water-absorbent component and a water-repellent component, in proportions to render the mass water-proof.

3. A shoe-bottom filler, consisting of a low-melting, quick-setting, resilient mass containing a water-absorbent component and a water-repellent adhesive component, in proportions to render the mass water-proof.

4. A shoe-bottom filler, consisting of a gelatinous body combined with a fatty acid to a tough rubber-like consistency mixed with comminuted shoe-filler material and having permanent elasticity and resiliency.

5. A shoe-bottom filler, consisting of a gelatinous body, combined with low melting, resinous ingredients.

6. A shoe-bottom filler, consisting of a gelatinous body, combined with low melting, resinous, water-repellent, adhesive ingredients.

7. A shoe-bottom filler, consisting of aqueously soluble gelatinous material previously dissolved in water but having its water solvent substantially eliminated, united with a resinous, adhesive material.

8. A shoe-bottom filler, consisting of soluble gelatinous material previously dissolved in a suitable solvent, but having said solvent substantially replaced in effect by a constant fluid, united with a resinous adhesive material.

9. A shoe-bottom filler, consisting of soluble gelatinous material previously dissolved in a suitable solvent but having said solvent substantially replaced in effect by a constant fluid, united with a resinous adhesive material and a fatty acid.

10. A shoe-bottom filler, consisting of soluble gelatinous material previously dissolved in a suitable solvent but having said solvent substantially replaced in effect by glycerin, united with a resinous adhesive material and a fatty acid.

11. A shoe-bottom filler, consisting of soluble gelatinous material previously dissolved in a suitable solvent but having said solvent substantially replaced in effect by glycerin, united with a resinous adhesive material.

12. A shoe-bottom filler, consisting of an aqueously soluble gelatinous material previously dissolved in water but having its water solvent substantially replaced in effect by glycerin, united with a resinous, adhesive material.

13. A shoe-bottom filler, consisting of an aqueously soluble gelatinous material previously dissolved in water but having its water solvent substantially replaced in effect by a constant fluid, united with a resinous adhesive material.

14. A shoe-bottom filler, consisting of an aqueously soluble gelatinous material previously dissolved in water but having its water solvent substantially replaced in effect by a constant fluid, united with a resinous adhesive material and a fatty acid.

15. A shoe-bottom filler, consisting of a permanently elastic, quick-setting, tenacious mass having a gelatinous base, adapted to be held in a shoe cavity for filling the shoe bottom.

16. A shoe-bottom filler, consisting of an unchangeable, permanently elastic, quick-setting, tenacious mass having a gelatinous base, adapted to be held in a shoe cavity for filling the shoe bottom.

17. A shoe-bottom filler, consisting of a permanently elastic, quick-setting, sticky mass, containing a gelatinous base.

18. A shoe-bottom filler, consisting of a quick-setting, sticky mass containing a gelatin and a fatty acid reduced to a tough, permanently pliable consistency.

19. A shoe-bottom filler, consisting of a permanently elastic, quick-setting, sticky mass, containing an unchangeable, adhesive, cohesive gelatinous base.

20. A shoe-bottom filler, comprising a water-repellent, tough, permanently elastic, quick setting mass, adhesive to leather, and containing a gelatinous base.

21. A shoe-bottom filler, comprising a water-repellent, unchangeable, tough, permanently elastic, quick setting mass, adhesive to leather, and containing a gelatinous base.

22. A shoe-bottom filler, comprising a permanently tenacious, non-inflammable, quick-setting, permanently resilient mass, containing a gelatinous base.

23. A shoe-bottom filler, obtained by uniting with a solution of gelatinous matter and a fatty acid, stiffening means and means to give stickiness and a low melting point.

24. A shoe-bottom filler, having a permanently tough consistency obtained by uniting with a solution of gelatinous matter and a fatty acid, stiffening material and means to give stickiness and a low melting point.

25. A shoe-bottom filler, having a permanently tough consistency obtained by uniting with a solution of gelatinous matter and a fatty acid, stiffening material, means independent of the gelatinous base for increasing the toughness of the compound, and means to give stickiness and a low melting point.

26. A shoe-bottom filler, consisting of a quick-setting, permanently pliable and workable composition containing a gelatinous base and resin.

27. A shoe-bottom filler, consisting of a quick-setting, permanently pliable and workable composition containing a gelatinous base and vegetable gutta-percha gum or the like.

28. A shoe-bottom filler, consisting of a quick-setting, permanently pliable and workable composition containing a gelatinous base and a viscous oil containing in solution resinous matter.

29. A shoe-bottom filler, consisting of a quick-setting, permanently pliable and workable composition containing a gelatinous base, resin to stiffen the mass and a vegetable gum of the nature of gutta-percha to toughen the mass.

30. A shoe-bottom filler, consisting of a quick-setting, permanently pliable and workable composition including a gelatinous base, resin to stiffen the mass, a vegetable gum of the nature of gutta-percha to toughen the mass, resinous residuum of petroleum and a viscous oil, operating in conjunction with the foregoing to lower the melting point, impart stickiness and provide water-repellent and stable qualities.

31. A shoe-bottom filler, consisting of a quick-setting, permanently pliable and workable composition containing a gelatinous base in solution with a fatty acid, and a vegetable gum of the nature of gutta-percha.

32. A shoe-bottom filler, consisting of a quick-setting, permanently pliable and workable composition including a gelatinous base in solution with a fatty acid, a vegetable gum of the nature of gutta-percha, and resinous residuum of petroleum.

33. A shoe-bottom filler, consisting of a quick-setting, permanently pliable and workable composition including a gelatinous base in solution with a fatty acid, a vegetable gum of the nature of gutta-percha, resinous residuum of petroleum, and a viscous oil.

34. A shoe-bottom filler, consisting of a quick-setting, permanently pliable and workable composition containing a gelatinous base in solution with a fatty acid, a vegetable gum of the nature of gutta-percha, and a viscous oil holding in solution a resinous substance.

35. A shoe-bottom filler, consisting of a quick-setting, permanently pliable and workable composition containing a gelatinous base in solution with a fatty acid, and resinous residuum of petroleum.

36. A shoe-bottom filler, consisting of a quick-setting, permanently pliable and workable composition containing a gelatinous base in solution with a fatty acid, resinous residuum of petroleum, and a viscous oil.

37. A shoe-bottom filler, consisting of a quick-setting, permanently pliable and workable composition containing a gelatinous base in solution with a fatty acid and a viscous oil holding in solution a resinous substance.

38. A shoe-bottom filler, consisting of a low-melting, quick-setting, resilient mass containing a water-absorbent component and a water-repellent component, mixed with finely comminuted filler material.

39. A shoe-bottom filler, consisting of a normally unchangeable, permanently elastic, quick-setting mass, composed of finely comminuted filler material having each granule entirely coated with a permanently sticky composition containing a gelatinous base.

40. A shoe-bottom filler, consisting of a permanently elastic, quick-setting, tenacious mass having a gelatinous base, mixed with finely comminuted fibrous material, adapted to be held in a shoe cavity for filling the shoe bottom.

41. A shoe-bottom filler, consisting of an unchangeable, permanently elastic, quick-setting, tenacious mass having a gelatinous base, mixed with finely comminuted fibrous material, adapted to be held in a shoe cavity for filling the shoe bottom.

42. A shoe-bottom filler, consisting of a filler body in a fragmentary condition, held together by a composition having a base of gelatinous material in a permanently tenacious, quick-setting, permanently elastic and moldable mass, of a non-shifting tendency when cold.

43. A shoe-bottom filler, consisting of a pemanently plastic, quick-setting, waterproof mass, adherent to leather and composed of finely comminuted filler material whose granules are coated with a tenacious, tough binder having a base of gelatinous material, rendered temporarily highly fluid by moderate heat.

44. A shoe-bottom filler, consisting of filler material in a fragmentary condition, and a compound which is permanently elastic, quick-setting and permanently sticky, having a gelatinous base, said fragmentary filler material and compound being thoroughly mixed together in the presence of heat.

45. A shoe-bottom filler, consisting of a permanently plastic, quick-setting, non-inflammable mass, adherent to leather and composed of finely comminuted filler material whose granules are coated with a tenacious, tough compound, having a base of gelatinous matter, capable of being rendered temporarily highly fluid by moderate heat.

46. A shoe-bottom filler, consisting of a permanently plastic, quick-setting, waterproof, and non-inflammable, mass, adherent to leather and composed of finely comminuted filler material, whose granules are coated with a tenacious, tough compound having a gelatinous base, capable of being rendered highly fluid by moderate heat.

47. A shoe-bottom filler, consisting of comminuted filler material and a permanently pliable, non-inflammable, gummy compound, having a gelatinous base, thoroughly mixed together into a homogeneous, normally unchangeable, tenacious mass, semi-solid when cold and freely plastic when hot, and having a low melting point.

48. A shoe bottom filler, containing comminuted filler material mixed with a gelatinous adhesive mass to a consistency rendering the filler capable of being spread by hand in a cold state forming a tenacious, normally pliable layer, normally adherent to the leather of the shoe-bottom.

49. A shoe-bottom filler, in the form of a thin strip of tough, permanently elastic material, highly pliable, having a low melting point, and quick-setting.

50. A shoe-bottom filler, in the form of a thin strip of tough, permanetly elastic material, highly pliable, having a low melting point, and quick-setting, said strip becoming intensely sticky upon superficial contact with a hot surface.

51. A shoe-bottom filler, in the form of a thin strip composed of finely comminuted filler material and a binder mixed together into a permanently elastic body, unchangeable in character when cold, and rendered highly sticky by heat.

In testimony whereof, I have signed my name to this specification, in the presence of two subscribing witnesses.

ANDREW THOMA.

Witnesses:
GEO. H. MAXWELL.
M. J. SPALDING.